J. NOVINSKY.
Tray for Beer-Glasses, &c.

No. 169,188.                            Patented Oct. 26, 1875.

WITNESSES                          INVENTOR.
A. C. Gridley                        Joseph Novinsky
F. F. Warner.

UNITED STATES PATENT OFFICE.

JOSEPH NOVINSKY, OF CHICAGO, ILLINOIS, ASSIGNOR OF ONE-HALF HIS RIGHT TO MATHIAS SWEHLA, OF SAME PLACE.

IMPROVEMENT IN TRAYS FOR BEER-GLASSES, &c.

Specification forming part of Letters Patent No. 169,188, dated October 26, 1875; application filed April 24, 1875.

*To all whom it may concern:*

Be it known that I, JOSEPH NOVINSKY, of Chicago, in the county of Cook and State of Illinois, have invented a new, useful, and Improved Tray for Beer-Glasses and for similar purposes, of which the following is a full, clear, and exact description, which will enable others skilled in the art to which my invention appertains to make and use the same, reference being had to the accompanying drawing forming a part hereof, and in which—

Figure 1:
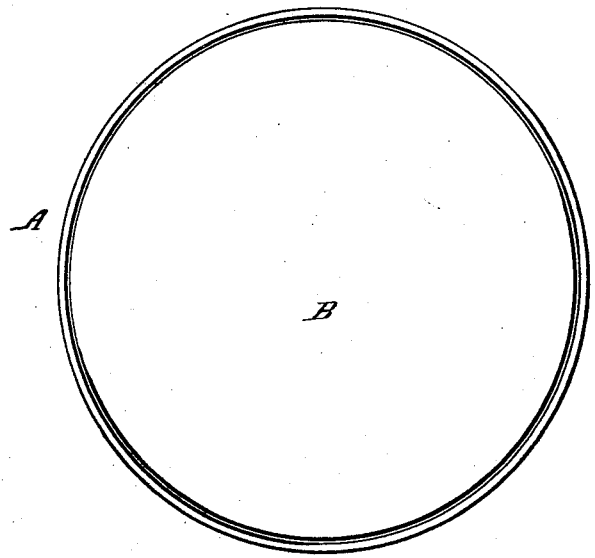
Figure 2:
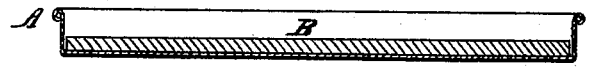

Figure 1 is a top or plan view of my improved device, and Fig. 2 a vertical central section thereof.

Like letters of reference indicate like parts.

Effervescent liquors, such, for example, as champagne and lager-beer, when poured into glasses or drinking-cups, are liable to overflow and run down upon the table, counter, and floor, thus requiring considerable care and attention to keep these places dry, and prevent the clothing from being soiled. My object is to make a small, cheap tray or basin to catch and absorb the overflowing liquor, and thus prevent it from being spilled.

To this end my invention consists of a shallow tray or basin, a little larger in diameter than the diameter of the bottom of the glasses or cups in which the liquor is served, and lined in the bottom with a removable mat made of absorbent material, substantially as hereinafter specified.

In the drawing, A represents the shallow tray or basin, which may be made of any suitable material, preferably of metal. B is the mat, arranged in the bottom of the tray or dish, and made of any suitable absorbent material, such, for example, as felt or sponge.

The liquor which runs over the edge of the glass or cup will flow into the basin or tray, and be absorbed by the matting, thus preventing the table, counter, clothing, and floor from being soiled.

When the matting becomes filled, it may be taken from the dish or tray, pressed dry, or nearly dry, and then replaced.

Having thus described my invention, what I claim as new, and desire to secure by Letters Patent, is—

The shallow tray or dish A, in combination with the removable absorbent mat B, arranged in the bottom of the tray, substantially as and for the purposes specified.

JOSEPH NOVINSKY.

Witnesses:
N. C. GRIDLEY,
F. F. WARNER.